(12) United States Patent
Warner

(10) Patent No.: US 9,070,991 B2
(45) Date of Patent: Jun. 30, 2015

(54) SYSTEM AND METHOD FOR INSULATING WIRE TERMINATIONS

(71) Applicant: Allan S. Warner, Clark, NJ (US)

(72) Inventor: Allan S. Warner, Clark, NJ (US)

(73) Assignee: JOYAL PRODUCTS, INC., Clark, NJ (US)

( * ) Notice: Subject to any disclaimer, the term of this patent is extended or adjusted under 35 U.S.C. 154(b) by 0 days.

(21) Appl. No.: 14/132,693

(22) Filed: Dec. 18, 2013

(65) Prior Publication Data

US 2014/0102787 A1  Apr. 17, 2014

Related U.S. Application Data

(62) Division of application No. 12/947,231, filed on Nov. 16, 2010, now Pat. No. 8,635,770.

(51) Int. Cl.
| | |
|---|---|
| H01R 4/00 | (2006.01) |
| H01R 4/70 | (2006.01) |
| H01B 7/282 | (2006.01) |
| H01B 19/00 | (2006.01) |
| H02G 1/14 | (2006.01) |
| H01R 4/20 | (2006.01) |

(52) U.S. Cl.
CPC ............. *H01R 4/70* (2013.01); *Y10T 29/49227* (2015.01); *Y10T 29/49183* (2015.01); *Y10T 29/49176* (2015.01); *Y10T 29/49931* (2015.01); *H01B 7/282* (2013.01); *H01B 19/00* (2013.01); *H02G 1/14* (2013.01); *H01R 4/20* (2013.01)

(58) Field of Classification Search
CPC .................................... H02G 1/00; H01R 4/00
USPC ...... 174/84 R, 88 R, 94 R; 428/573, 574, 576, 428/577, 586, 594, 595, 600, 606; 439/877
See application file for complete search history.

(56) References Cited

U.S. PATENT DOCUMENTS

| | | | | | |
|---|---|---|---|---|---|
| 2,034,033 | A | * | 3/1936 | Green et al. | 333/243 |
| 2,497,707 | A | * | 2/1950 | Wetherill | 156/47 |
| 3,703,623 | A | * | 11/1972 | Swengel, Sr. | 219/137 R |
| 5,869,784 | A | * | 2/1999 | Shinchi | 174/84 R |
| 6,125,533 | A | * | 10/2000 | Warner et al. | 29/868 |
| 6,671,952 | B2 | * | 1/2004 | Ono | 29/860 |
| 6,855,409 | B1 | * | 2/2005 | Urushizaki et al. | 428/309.9 |
| 8,635,770 | B2 | * | 1/2014 | Warner | 29/858 |
| 2002/0170729 | A1 | * | 11/2002 | Murakami et al. | 174/35 R |

* cited by examiner

*Primary Examiner* — William H Mayo, III
(74) *Attorney, Agent, or Firm* — Lowenstein Sandler LLP

(57) ABSTRACT

A method for insulating wires is disclosed. A portion of the plurality of wires and an insulating material are placed in a tube having an open end. Pressure is applied to the tube. During the application of pressure, the tube, the plurality of wires, and the insulating material are heated to a temperature above a melting point of the insulating material. As a result, the insulating material is melted and driven toward the open end of the tube. Upon removal of the heat, the insulating material solidifies and forms a barrier proximal to the open end of the tube.

10 Claims, 13 Drawing Sheets

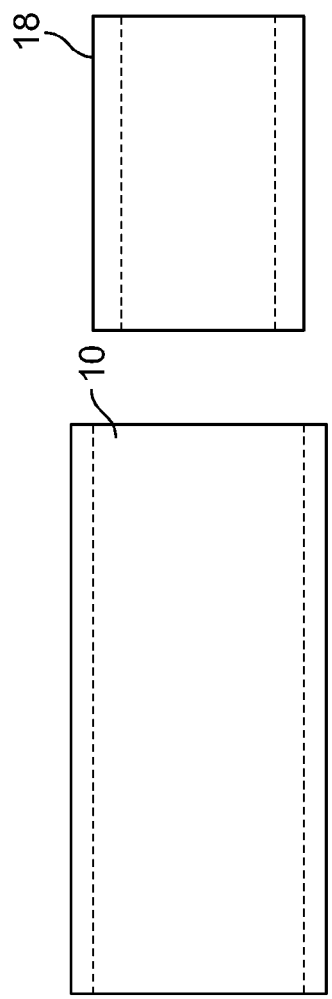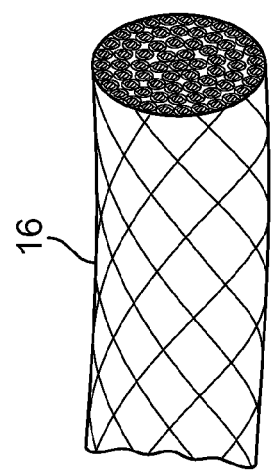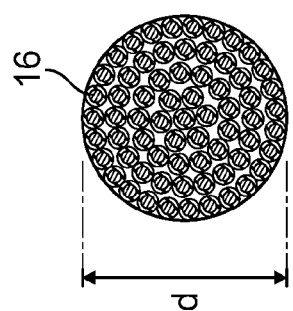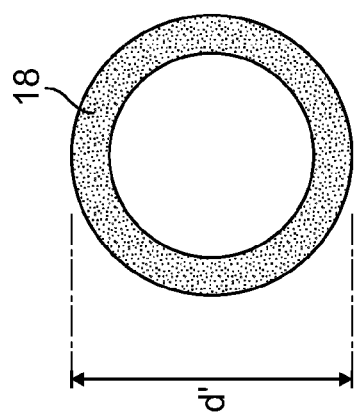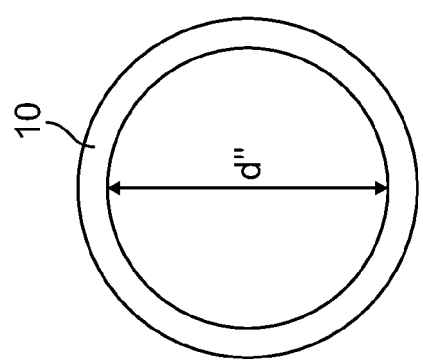
FIG. 2
FIG. 3

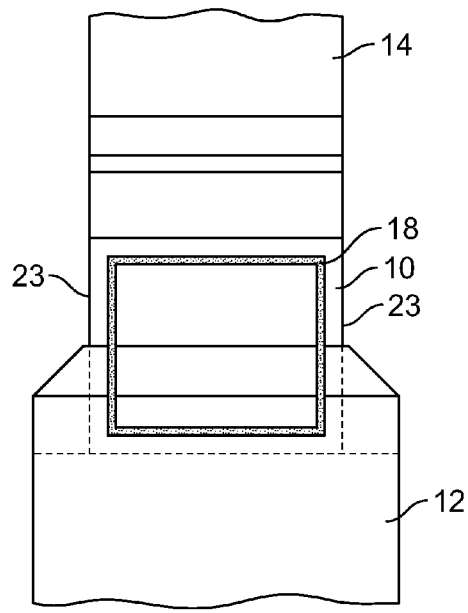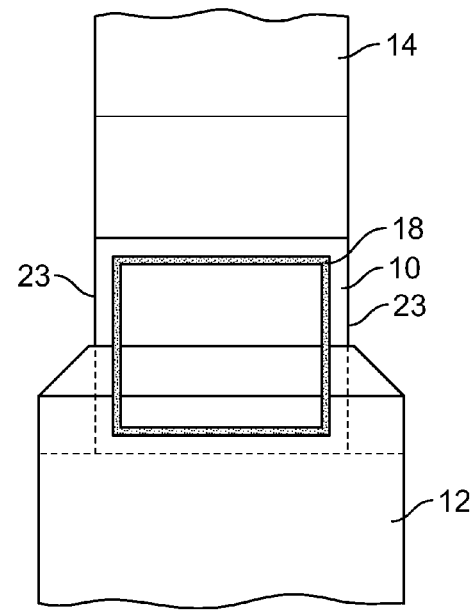
FIG. 6A    FIG. 6B
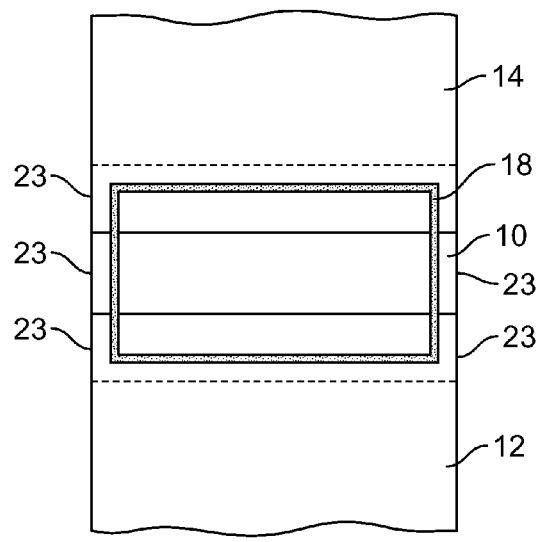
FIG. 6C

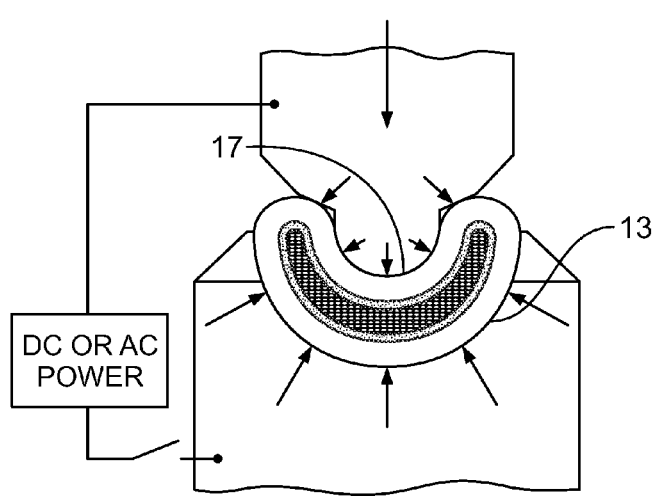
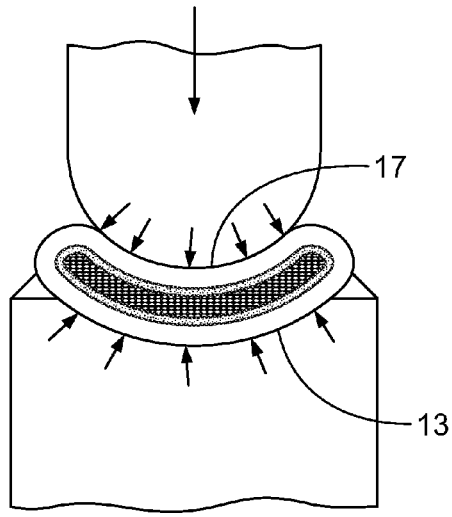
FIG. 9A          FIG. 9B
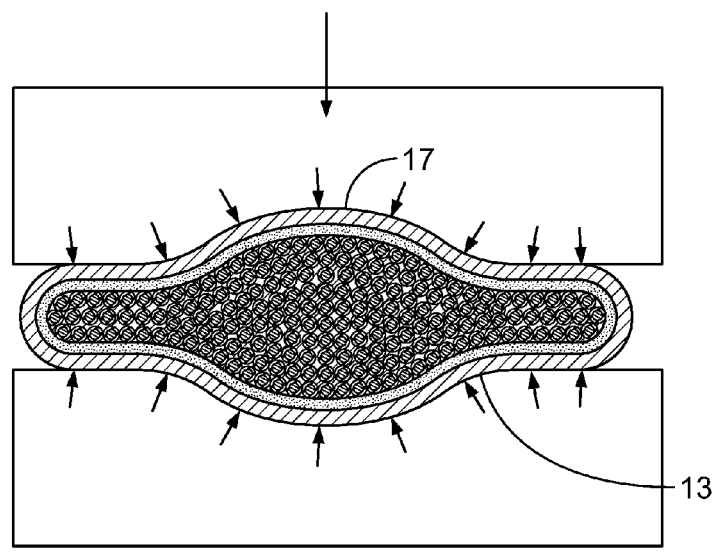
FIG. 9C

SYSTEM AND METHOD FOR INSULATING WIRE TERMINATIONS

CROSS-REFERENCE TO RELATED APPLICATIONS

This application claims the benefit of and is a divisional application of U.S. patent application Ser. No. 12/947,231 filed Nov. 16, 2010, the disclosure of which is incorporated herein by reference in its entirety.

FIELD OF THE INVENTION

The present invention relates generally to cabling systems and connections, and more particularly, to a system and method for insulating and sealing terminations of wire.

BACKGROUND OF THE INVENTION

When alternating current at elevated frequencies passes through a wire, a phenomenon occurs that forces the outer surface or skin of a wire to carry most of the electrical current. This phenomenon, called the skin effect, increases in intensity as the frequency of operation increases. One type of wire that compensates for the skin effect is Litz wire. Litz wire, from the German "Litzendraht"—Litz for "strands" of wire and Draht for "wire", is a type of electrical conductor that comprises multiple strands of individually insulated wires that allow the flow of high frequency alternating electrical current without appreciable loss because of electrical resistance or impedance in the conductors. The diameter of individual Litz wire strands is very small, and its radius is about the same or less than the depth of skin effect conduction. By bundling many individually insulated small wires together, the skin effect may be negated.

In addition to Litz wire, bundles of ordinary stranded wire employed at low frequency are not appreciably affected by the Skin Effect. As a result, stranded wire may be employed in electric motors, transformers, etc. Stranded wire overcomes many problems encountered with a single solid wire having about the same total diameter. If the stator of an electric motor stator is wound with a large diameter wire or a heavy cable is placed into the lamination of a transformer, it would be difficult to bend the wires into place. However, many individually insulated smaller diameter wires may be substituted for one large insulated solid wire. A bundle of smaller diameter wires having an overall diameter of a single wire may be bent and angled much more easily than the single large diameter wire.

Since Litz wire is made of many individually insulated wires, it is difficult to terminate unless all of the insulation in the termination area is first removed. Unfortunately, removing this insulation may damage the wire's physical structure. Until recently, low temperature film insulation was used, which was removed by dipping the insulated wire bundle into molten solder to burn off the insulation. However, the trend has been to use high temperature film insulation, which molten solder cannot remove. Crimp terminals cannot make a satisfactory connection, because the terminal's insulation piercing teeth cannot reach every strand in the Litz wire bundle. Another method is to use fused salts to chemically dissolve the organic film insulation. This does not work well in production because the chemical residue from the salts cannot be completely removed from inside the Litz wire bundle after the insulation is dissolved. Removing the insulation strand by strand is a labor intensive and time consuming process.

To date, the only proven successful production method to terminate large bundles of insulated wire is tube fusing, using the SN-Fusing process. The general term "fusing" is a method of joining low resistance metals with a type of machine similar to a resistance welding machine, but without appreciable distortion or damage to the parts being joined. Normally, when copper is resistance welded (i.e., spot welded, butt welded, etc.), it is drastically distorted to a point where some of the metal looses its physical integrity. This does not occur with fusing.

There are different methods of wire fusing, including "commutator fusing," also known as "tang fusing," and "hot staking" or "SN-fusing." In commutator/tang fusing, the parts are heated, cleaned, softened, and pushed together until all the air between them is eliminated, and the high points of one metal part are pushed into the low points of the other. A surface adhesion contact holds the parts together.

With SN-fusing, or tin-fusing, a diffusion metallurgical bond is developed. If tin is heated until it is liquid, and a bar of copper is inserted into the molten liquid tin, the copper bar eventually dissolves. This solvent action, called wetting, is what permits tin to coat copper by dissolving its surface molecules. Tin adheres the surface of copper with a strength comparable to that which a piece of solid metal holds itself together, that is, by the attraction between adjacent atoms. Tin, being attached by such attractive forces, cannot be mechanically pried from the surface of the copper. Further, tin cannot be completely drained or wiped away when molten or liquid, since the surface of the copper remains permanently wetted by a film of the tin. A copper/tin inter-metallic compound is formed whenever tin wets copper. This compound itself is not strong. Therefore, by using a minimum amount of tin brought in contact with a base copper alloy for as short a time as possible, the copper may be "tinned" (i.e., wetted or coated), while keeping the basic strengths and properties of copper. For tinning to occur, the copper must be relatively clean of any foreign matter.

SN-fusing comprises six basic steps as illustrated in FIG. 1. In Step S1, fusing pressure is applied to the parts that are being joined, until a preset level of pressure is reached. In step S2, heat is applied to a fusing electrode(s), and then dissipated into the parts being fused. In Step S3, as heat in the parts being fused increases, the wire's film insulation, if any, is vaporized. In Step S4, the tin, which is at its molten point, acts as a solvent to clean the surface of the copper conductors. In step S5, as the dissipated heat increases, the tin and any inter-metallic compounds are vaporized and/or driven from the joint's interface. In step S6, the resultant ultra-pure copper at the interface of the parts is then fused, resulting in a diffusion bond. However, the fusing pressure must be continually applied until the joint cools to a reasonable temperature, otherwise the plastic metals may separate because of the contractual forces that are being applied to them during cooling.

When many individual wire leads need to be joined together or to other stranded or solid wire, a tinned tube may be used. The tube acts as a gathering device as well as a mechanical terminal. The wires are placed into a tinned copper tube. Fusing electrodes then engulf the tube and it is fused. The advantage of the tube is that the tin inside the tube cannot easily be removed from the joint area during heating, since the tube holds it in place. Therefore, the tin wets most (or all) of the wires inside the tube before it is driven out of the joint. This means that most, if not all, of the conductors inside the tube, will be cleaned by the tin.

Unfortunately, wetting all of the copper wires with tin does not always result because the amount of tin that coats the terminal's tube is extremely small. To overcome this problem, additional heat and compression may be applied. The tin and the compression sealing of the joint help protect the termination from outside environmental pollution. This pollution is normally atmospheric gases as well as moisture. However, when the termination, after fusing, is immersed in a liquid that has a very thin consistency, the liquid may be drawn into the termination through capillary action, where the non-tin coated material is not diffusion bonded to the wires in the center of the bundle, or at the ends of the tube where the wires enter the tube. Most liquids will not damage a diffusion bonded joint if the wires keep their tin coating just outside of the joint area. Certain fluids, such as human body fluids, tend to corrode the wires at the point where they enter the termination's tube structure. This corrosion weakens the physical integrity of the wire bundle as it enters either side of the tube. Eventually, the wire bundle may be weakened to a point where the wires actually break or they have lost enough strands so that the current passing through them overheats because of resulting high resistance area(s) in the wire. As this over-heated area continues to heat the wire, the electrical connection may be destroyed.

Further, while fusing without tin is normally employed to join bare stranded wire to other bare stranded wire or solid bare wire, in certain circumstances, tin coated tubes may also be used. The phenomenon of moisture entering the terminating tube may also occur when tin is used to coat the interior of the tube.

If this type of corrosion and erosion continues for some time, the electrical characteristics of the termination may be in jeopardy because of the resulting increase in the electrical resistance, which may affect the wire's ability to conduct electrical power. This has happened to pacemaker or defibrillator leads that are inserted into a human body for prolonged periods of time. At the point of lead failure, the only solution is to replace the leads. Of course, this means that a surgical procedure needs to be performed.

One method of solving the corrosion problem is to apply a hot melt plastic material to both ends of the tube. However, this may not be easily done automatically. Also, for an intimate seal to result between the metal terminal and the plastic material, both materials would have to reach the temperature of, or above, the melted plastic. If the entire terminal's ends do not reach this temperature, the plastic will not make intimate contact with the metal.

Accordingly, what would be desirable, but has not yet been provided, is a system and method for insulating fused Litz or bare stranded wire terminations that overcomes the deficiencies in the prior art described hereinabove.

SUMMARY OF THE INVENTION

The above-described problems are addressed and a technical solution is achieved in the art by providing a method for insulating a plurality of wires, comprising the steps of: placing a portion of the plurality of wires and an insulating material in a tube having an open end; applying pressure to the tube; and during the applying of pressure step, heating the tube, the plurality of wires, and the insulating material to a temperature above a melting point of the insulating material, wherein the insulating material is melted and driven toward the open end of the tube.

Upon removal of the heat, the insulating material solidifies and forms a barrier proximal to the open end of the tube. The applied pressure and heat are sufficient to deform the tube and compress the wires, the insulating material, and the tube together such that the wires are pressed against other wires and the insulating material. The heat is sufficient to fuse the wires to each other but insufficient to melt the tube or wires.

According to an embodiment of the present invention, the insulating material may be a thermoplastic or wax. The insulating material may have the shape of a solid tube, or may be sprayed on either the wires or on an inner surface of the tube, or the wires may have been previously coated with insulating material. Alternatively, the insulating material may have the shape of a washer which is initially oriented along a plane perpendicular to the wires and the tube proximal to the open end of the tube.

According to an embodiment of the present invention, the insulating material maintains the same composition upon heating and re-solidifying.

According to an embodiment of the present invention, the tube may be open at both ends, whereby the insulating material is driven toward the ends and forms an insulating barrier about the wires proximal to the ends.

According to an embodiment of the present invention, the tube is initially closed at one end, whereby the insulating material is driven toward the open end and forms an insulating barrier about the wires proximal to the open end.

According to an embodiment of the present invention, the tube is initially closed at one end and an opening in the closed end is formed to relieve pressure buildup of volatized materials.

According to an embodiment of the present invention, the insulating barrier is substantially impermeable to fluids, including bodily fluids.

The above-described problems are addressed and a technical solution is achieved in the art by providing an insulated wire joint, comprising: a tube having an open end; and a portion of a plurality of wires placed in the tube; and an insulating material formed proximal to the open end of the tube by the application pressure and heat to the tube, the portion of the plurality of wires, and the insulating material. During the application of pressure and heat, the temperature of the insulating material is raised above its melting point, thereby driving the insulating material away from the generated heat toward the open end. Upon removal of heat, the insulating material solidifies.

BRIEF DESCRIPTION OF THE DRAWINGS

The present invention will be more readily understood from the detailed description of exemplary embodiments presented below considered in conjunction with the attached drawings in which like reference numerals refer to similar elements and in which:

FIG. 2 is a side view of one example of a tube termination, wires, and insulating material to be assembled into a terminated wire assembly, according to an embodiment of the present invention;

FIG. 3 is a front view of the tube, stranded wire, and insulating material of FIG. 2;

FIGS. 6A-6C are side views of FIGS. 5A-5C, respectively;

FIGS. 9A-9C are diagrammatic views showing the electrodes and tube/wire assemblies of FIGS. 8A-8C, respectively, during the application of electrode pressure but before the application of electrical power;

Figure 1:
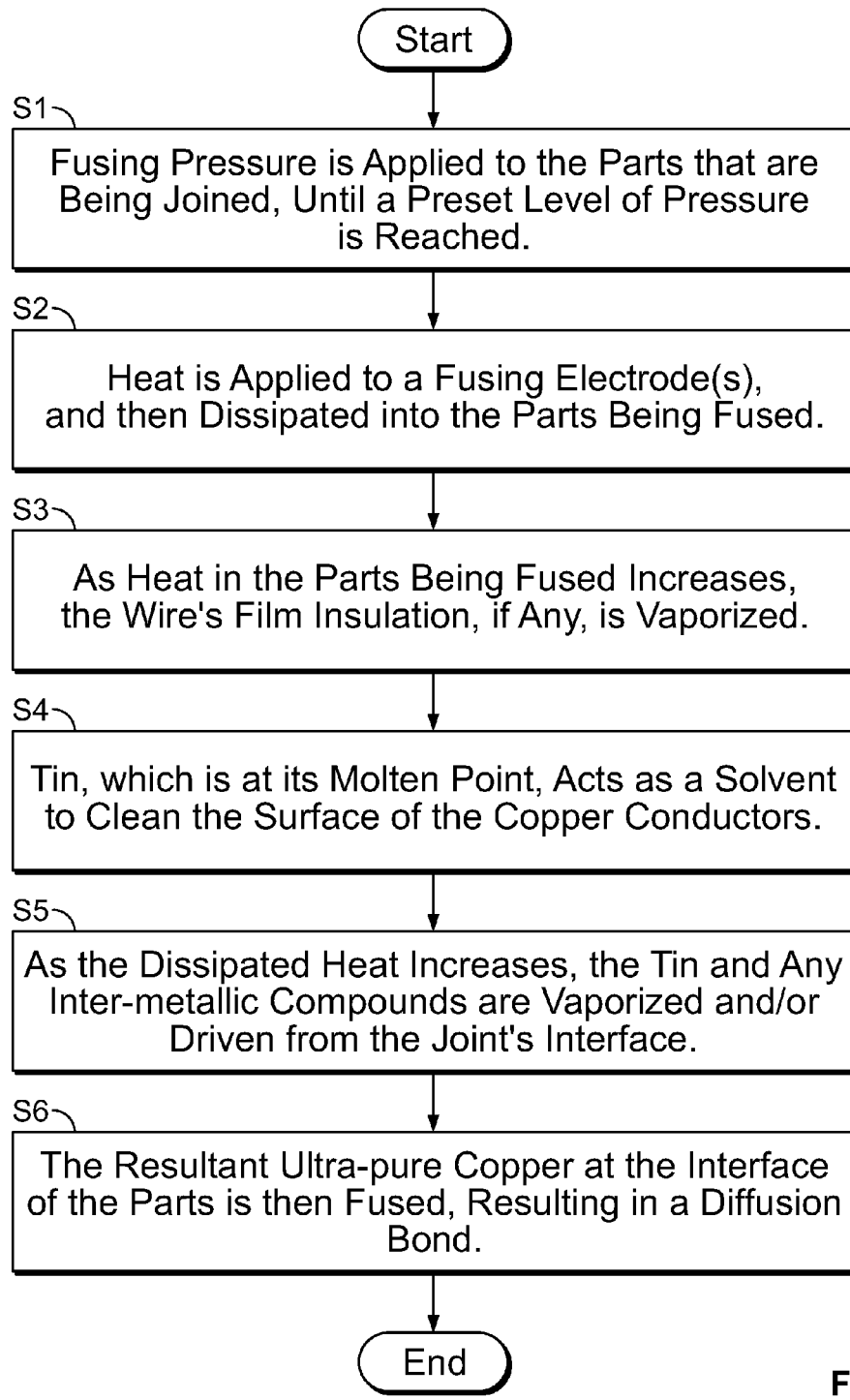
FIG. 1 is a process flow exhibiting exemplary steps of conventional SN-fusing (i.e., tin-fusing)
Figure 4A:
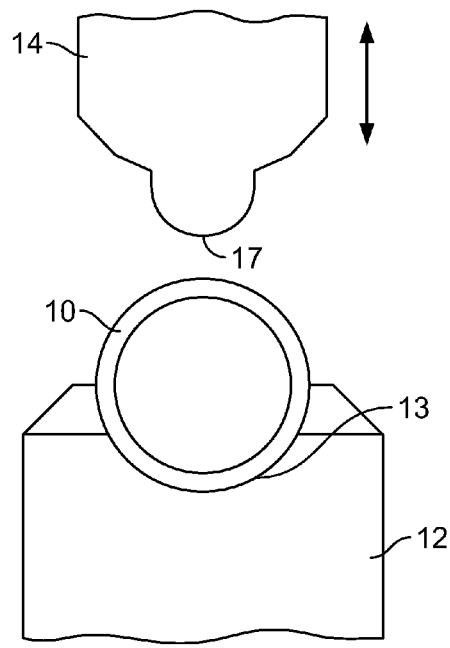
FIGS. 4A-4C and FIGS. 5A-5C show the tube of FIG. 3 and a pair of fusing electrodes, according to certain embodiments of the present invention.
Figure 4B:
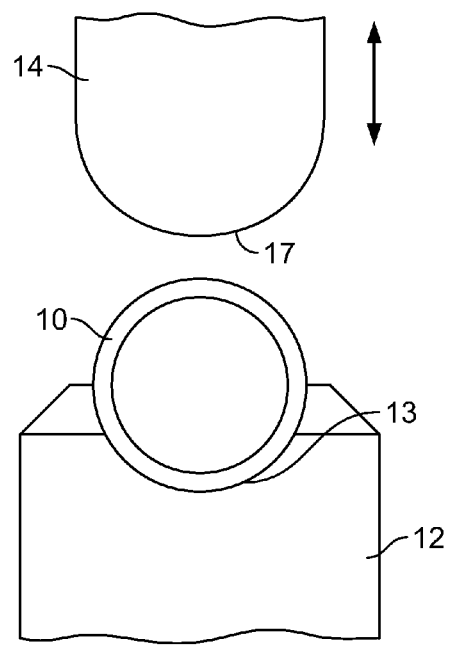
Figure 4C:
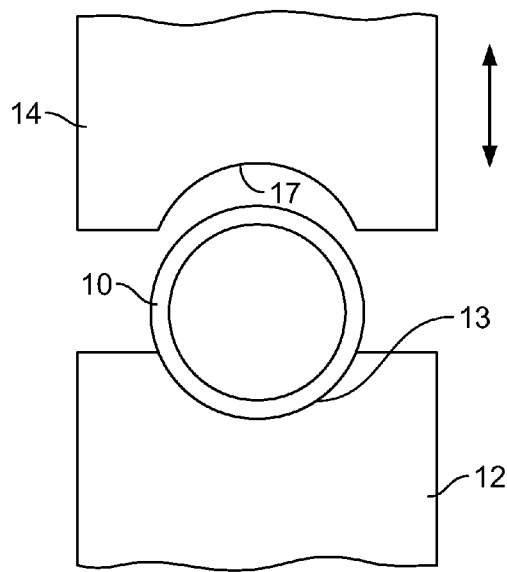
Figure 5A:
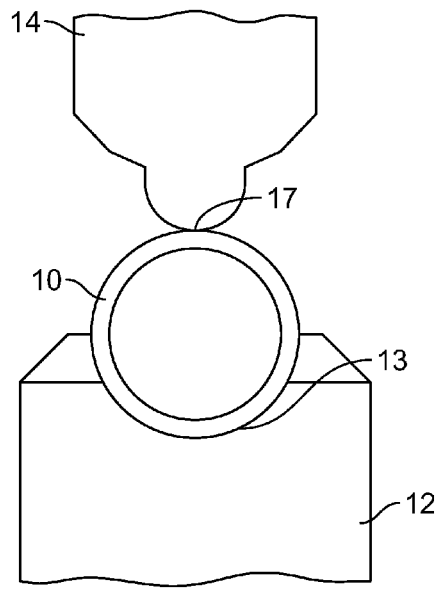
Figure 5B:
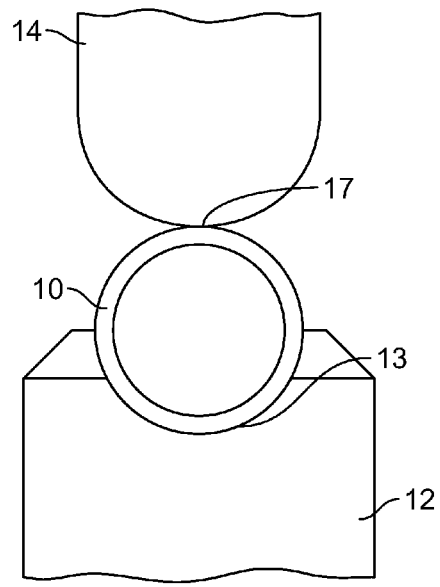
Figure 5C:
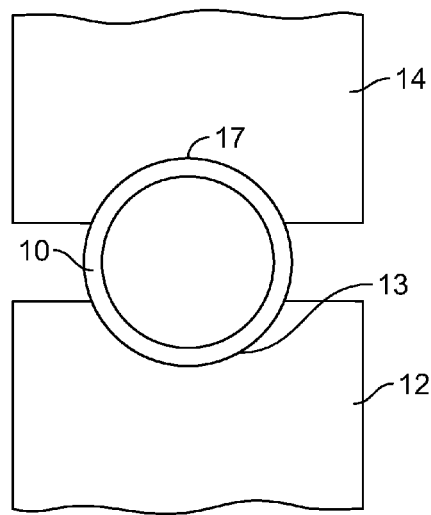
Figure 7A:
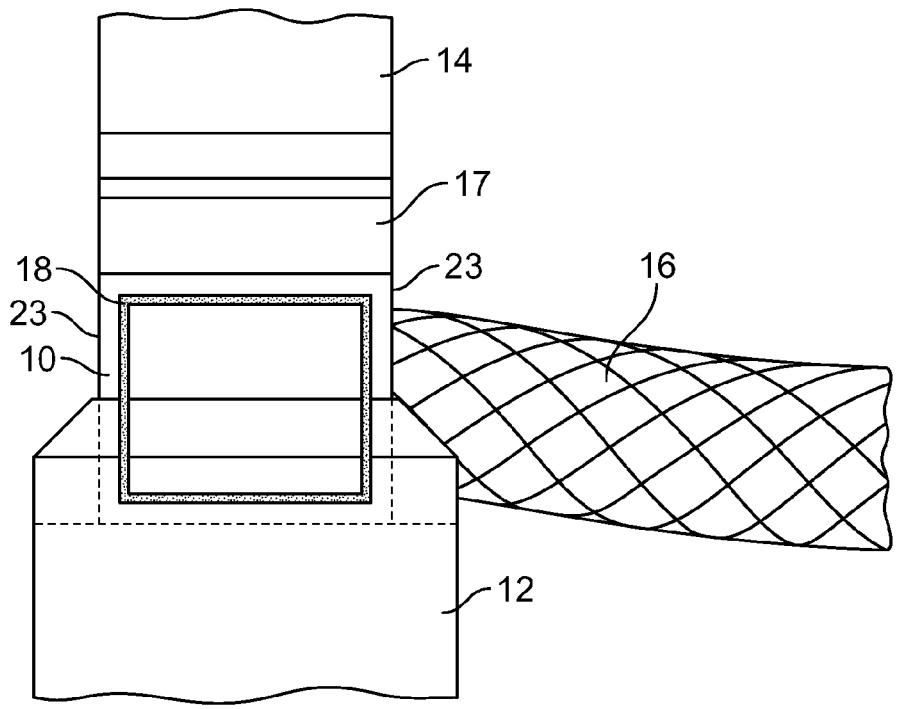
FIGS. 7A-7C and 8A-8C are side and rear views, respectively, of the tube held by the electrodes with the insulating material and wires inserted into the tube termination, according to certain embodiments of the present invention.
Figure 7B:
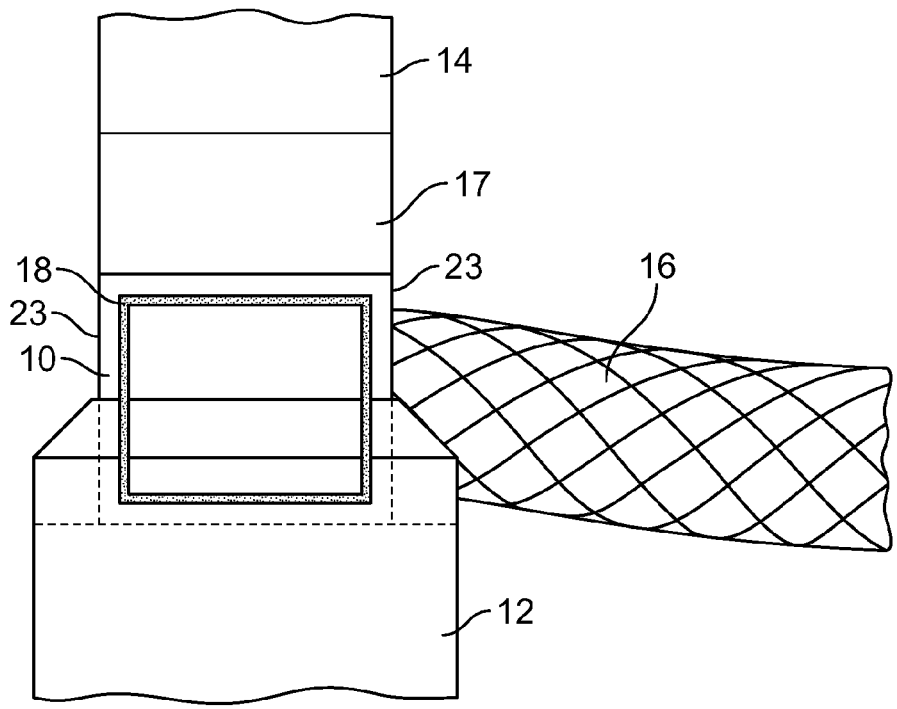
Figure 7C:
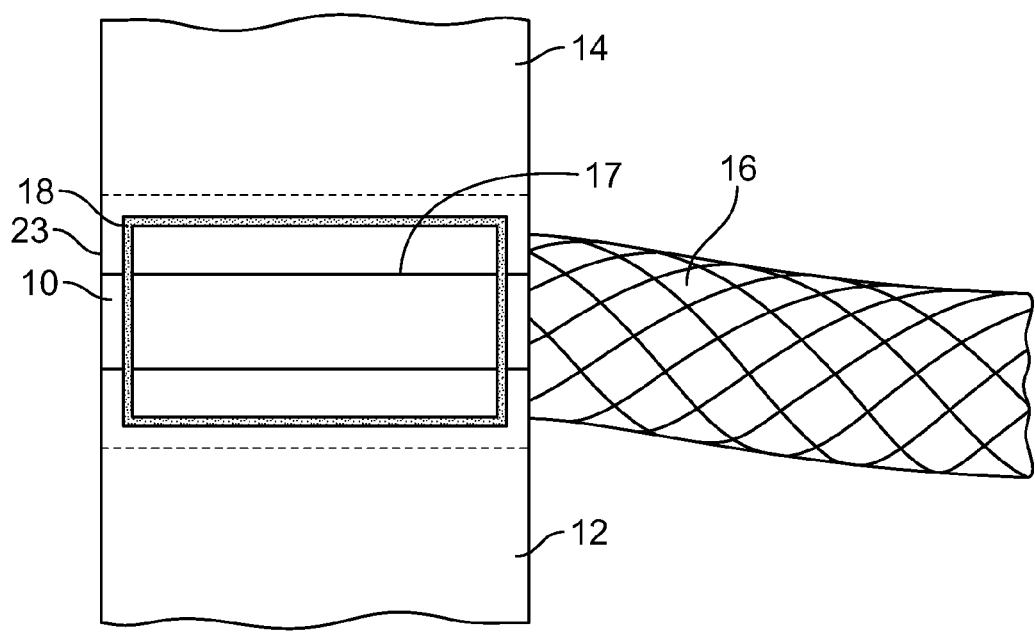
Figure 8A:
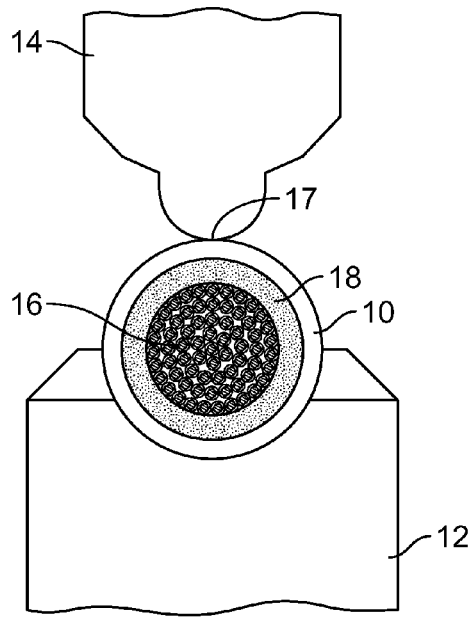
Figure 8B:
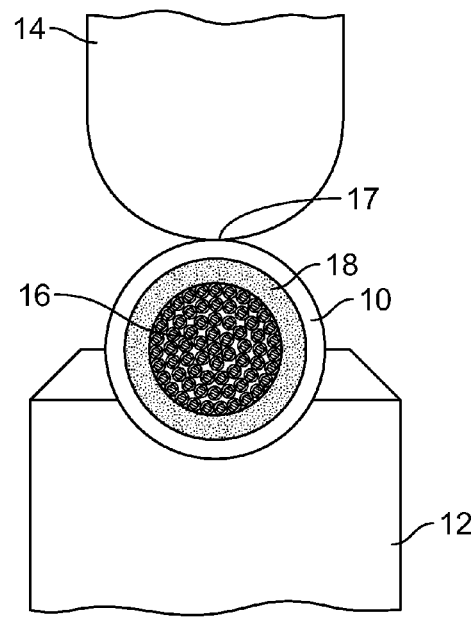
Figure 8C:
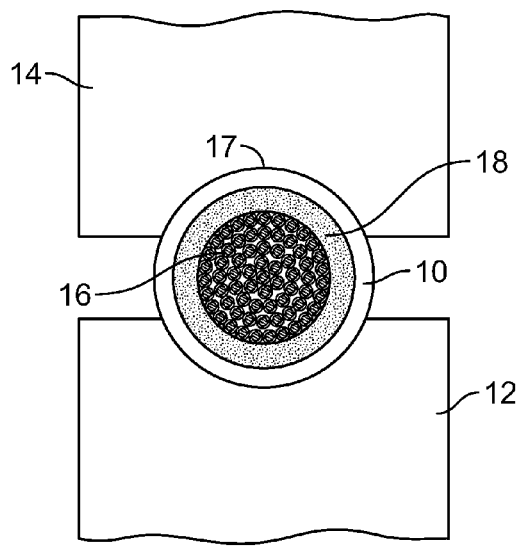
Figure 10A:
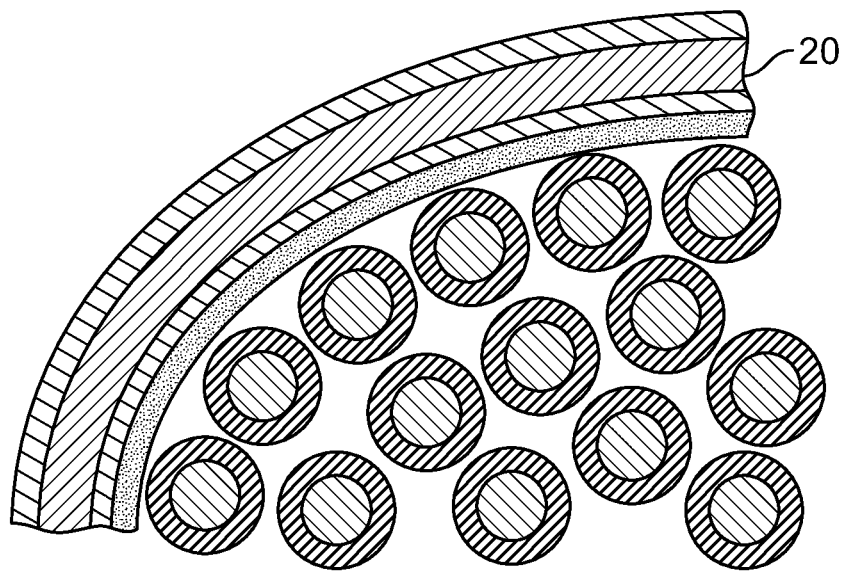
FIGS. 10A and 10B are partial exploded views of a part of the tube and wires of FIGS. 9A-9C.
Figure 10B:
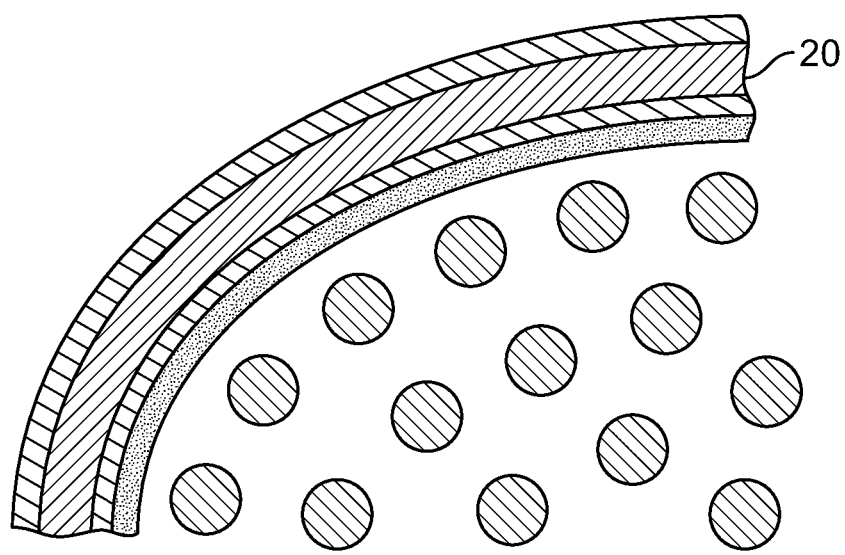
Figure 11:
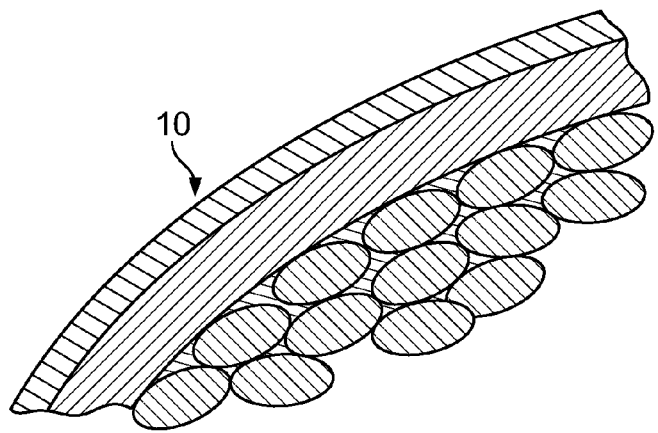
FIG. 11 is similar to FIGS. 10A and 10B but after the application of heat and electrical power.

It is to be understood that the attached drawings are for purposes of illustrating the concepts of the invention and may not be to scale.

DETAILED DESCRIPTION OF THE INVENTION

With reference to FIGS. 2 and 3, the present invention includes the use of a terminal tube 10 made of suitable metal such as copper, brass, bronze, steel, or other alloys, depending upon the application. The present invention further includes bare or insulated, solid or stranded wire 16 and an insulating material 18. In a preferred embodiment, the terminal tube 10 comprises a tin-plated cylindrical tube which is easily manufactured and simply cut and tinned in tubular form. Alternatively, the terminal tube 10 can be made from rolled sheet metal with a soldered, welded seam, or otherwise joined seam (not shown). A preferred feature is that the terminal tube 10 should be electrically continuous such that current and heat will flow evenly through both half-cylinders of the terminal tube 10 in a manner described below. It is also preferred that the cross-sectional shape of the terminal tube 10 be substantially circular so that an operator or a mechanical placement apparatus need not be concerned with the angular orientation of the terminal tube 10 with respect to fusing electrodes 12 and 14 (to be described hereinbelow). In certain embodiments, a tube may have a slit along its length. If a tube having an angular (e.g., square) shape in cross-section with a slit is placed in an assembly with the slit face down, and pressure is applied to the non-slit side, the terminal tube 10 may spread apart at the slit, resulting in a failed termination.

In a preferred embodiment, the insulating material 18 is a thermoplastic. In an alternative embodiment, the insulating material 18 is made of wax or other plastic(s). In a preferred embodiment, the insulating material 18 may be formed into a hollow tube having an inner diameter, d', that is larger than an outer diameter, d, of the wire(s) 16 and an outer diameter that is smaller than an inner diameter, d", of the terminal tube 10. The insulating material tube 18 may be inserted about the wire(s) 16 and the terminal tube 10 inserted about the insulating material tube 18 prior to a heating and deformation step to be described hereinbelow with reference to FIGS. 7A-7C and 8A-8C.

In yet another alternative embodiment, the insulating material 18 may be sprayed on the wire(s) 16 or on an inner surface of the terminal tube 10. In yet another alternative embodiment, the insulating material 18, may have the shape of a washer, wherein, prior to heating and deformation steps, the washer-shaped insulating material 18 is placed about the wire(s) 16, and the terminal tube 10 is placed about the washer-shaped insulating material 18 proximal to one or both ends of the terminal tube 10 oriented along a plane perpendicular to the longitudinal orientation of the wire(s) 16 and the terminal tube 10.

In a preferred embodiment, the insulating material 18 has thermal and chemical properties such that it melts without decomposing during the application of heat and electricity to be described hereinbelow, but re-solidifies without decomposing when heat and electricity are removed. The insulating material seals the termination in two ways: (1) the molten insulating material 14 glues itself to the wire(s) 16 and the terminal tube 10, and (2) the molten insulating material glues itself together and seals the wires 16 after they are individually coated.

With reference to FIGS. 4A-6C, the method according to the present invention includes the use of a pair of fusing electrodes 12 and 14. Unlike low resistance welding electrodes, at least one of the fusing electrodes 12 and 14 comprise high resistance electrodes, typically made of tungsten or other suitable material, and serve to apply to the work high pressure, high heat, and some current as further described below. The fusing electrodes 12 and 14 are mounted for movement toward and away from each other. In the illustrated embodiments, the fusing electrode 12 is stationary and the fusing electrode 14 is mounted for vertical movement. However, if preferred, both electrodes can be mounted for movement, and/or the electrodes can be mounted for relative horizontal movement.

The fusing electrode 12 has a fusing face that forms a cavity 13 for receiving the terminal tube 10 generally as shown in FIGS. 4A-6C and functions apply fusing pressure, heat and current throughout the bottom half of the terminal tube 10. Also, the cavity functions to confine the flow and expansion of the terminal tube 10 and the wire(s) 16 therein, but is operable to melt the insulating material 18 and cause it to flow toward the ends 23 of the terminal tube 10, as described below, which enables increased pressure to be applied to the work assembly. In the illustrated embodiment, the cavity 13 is generally semicircular with approximately the same diameter as the outer diameter of terminal tube 10 and extends to approximately half the vertical diameter of terminal tube 10 when the latter is placed therein.

The fusing face of the fusing electrode 14 is shaped to extend toward the cavity 13. A central section 17 functions to compress the side of the terminal tube 10, the insulating material 18, and the wires 16 therein toward the cavity 13 with a greatest pressure being applied towards the center region of the work assembly. The central section 17 is configured to apply pressure, heat, and current to the outer parts of the work assembly during the fusing.

After the terminal tube 10 is placed in the cavity 13, the fusing electrode 14 is advanced to engage the terminal tube 10 with a slight force of about five pounds. The fusing electrode 14 thus serves to hold the terminal tube 10 in place while the wire(s) 16 and the insulating material 18 are inserted into the terminal tube 10. Alternatively, the wire(s) 16 may be placed into the terminal tube 10 by hand prior to placing the terminal tube 10 into the fusing electrode 14. Therefore the terminal tube 10 with the wires 16 would be manually placed into the machine. See FIGS. 7A-7C and 8A-8C. An operator or automatic visual inspection system can then inspect the work assembly to see if all elements are properly positioned and are free from defects. If for any reason, the work assembly elements are not in the proper position for fusing, the wire(s) 16 and/or the insulating material 18 may be removed, the fusing electrode 14 may be backed off, and the terminal tube 10 may be repositioned, if necessary.

Once the terminal tube 10 is repositioned, if necessary, then the fusing actuator switch may be energized. Accordingly, the fusing electrode 14 is driven toward the fusing electrode 12, generally as shown in FIGS. 9A-9C. Pressure increases on the work assembly making an intimate contact between the fusing electrodes 14 and 12 and the terminal tube 10. Fusing current and heat are preferably not fully applied during the first 25-45 milliseconds, but are gradually increased from very low to a maximum during which the terminal tube 10 is softened and greatly deformed and much of the air space between parts is eliminated. As seen in FIGS. 9A-9C, the pressure applied by the cavity 13 is applied to the bottom outer half surface of the terminal tube 10 and is directed toward the original axis of the terminal tube 10. The pressure is applied to the central region of upper outer half surface of the terminal tube 10 and is directed in opposition to the direction of the pressure applied by the cavity 13. These pressures are generally indicated by the arrows of FIGS. 9A-9C.

Once a predetermined pressure or displacement is reached between the fusing electrodes 12 and 14, fusing power in the form of AC or DC current is applied through the fusing electrode 14 initially through the terminal tube 10 only, through the fusing electrode 12. The fusing electrodes 12 and 14 as well as the terminal tube 10, the wire(s) 16, and insulation heat to about 1900 degrees F. Because of the shape of terminal tube 10 and the shapes for the fusing electrodes 12, 14, fusing current flows from the fusing electrode 14 through both side cylinder portions of deformed tube 10 to the fusing electrode 12. Thus current and heat is applied throughout the length for the work assembly to enhance the integrity and reliability of the finished joint.

Figure 12:
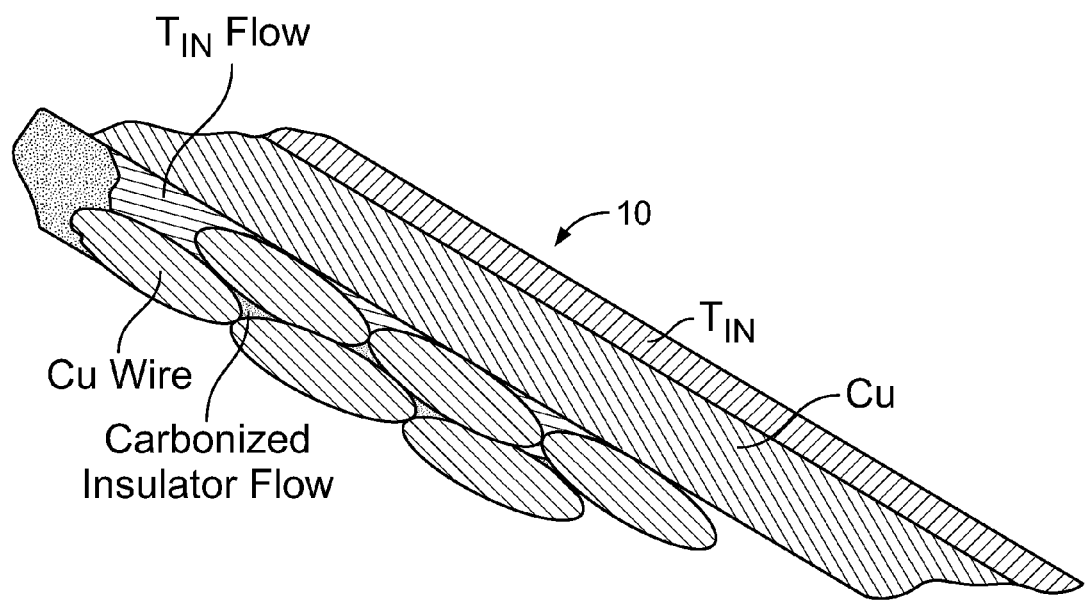
FIG. 12 is an enlarged view of FIG. 11.

Accordingly, the great heat applied to the work assembly vaporizes much of the insulation about wire(s) 16, if present, and causes the insulating material 18 to melt and flow away from the heat sources toward the free end(s) 23 of deformed tube 10 and/or toward any remaining microspaces between parts. During this time, current also begins to flow through the copper wire(s) 16 as the insulation burns off to expose the copper which is still under pressure and forced and deformed against other exposed copper wires and the inside of the terminal tube 10. Also, application of fusing heat and current through the terminal tube 10 causes the inside tin coating 20 to wet some of the exposed copper wires and to flow toward open microspaces between the deformed wires that become forced together. See FIG. 12. It should be understood that none of the metal parts amalgamate nor become liquid during the fusing process. The metal materials only soften and yield to pressure to deform against each other creating a mechanical bond or compression joint between parts. For further information about the use of tin in fusing systems, see JOINING COPPER CONDUCTORS USING TIN-FUSING by S. Karpel, QUARTERLY JOURNAL OF THE INT. TIN RESEARCH INSTITUTE, No. 145, 1985, which is incorporated by reference in its entirety.

Figure 13:
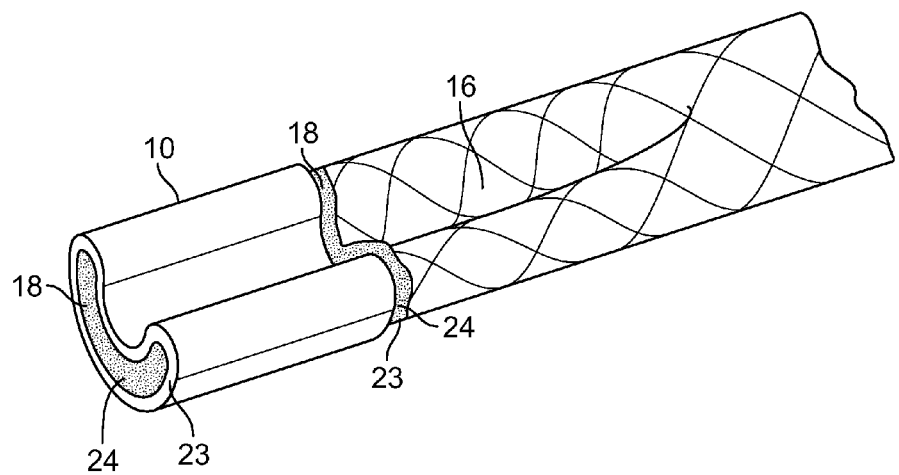
FIG. 13 is a perspective of a terminated tube and wire assembly made pursuant to the above described method.

After heat, electricity, and pressure are removed from the deformed tube 10, the insulating material 18 re-solidifies. FIG. 13 shows that final termination for a preferred embodiment illustrated in the previous Figures. The deformed tube 10 comprises an elongated bow-shaped termination for a plurality of previously (insulated) wires with great mechanical integrity. One or both of the ends 23 of the deformed tube 10 and a portion 24 of the wire(s) 16 proximal to one or both ends 23 of the deformed tube 10 is coated with the re-solidified insulating material 18. The coated wire(s) with insulating material 18 thereon are substantially impermeable to fluids, be they gaseous or liquid. As a result, the resulting wired termination may be suitable for insertion in the human body and is further impermeable to bodily fluids.

Figure 14:
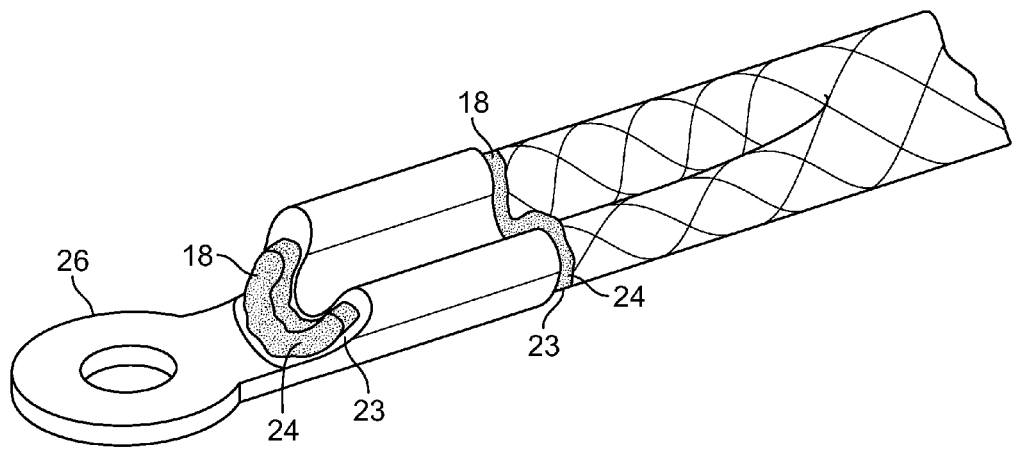
FIG. 14 is similar to FIG. 13 and shows an alternate form of tube termination.
Figure 15:
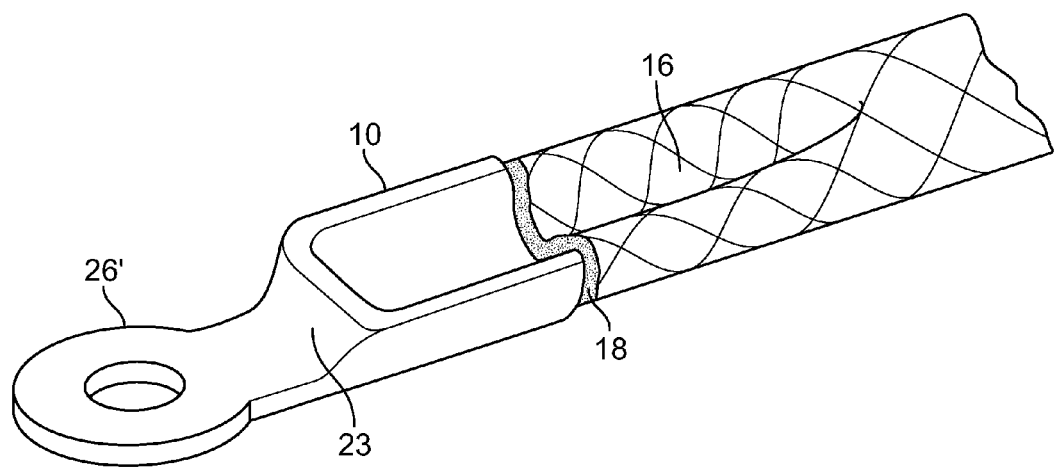
FIG. 15 is similar to FIG. 14 and shows the tube termination substantially closed/sealed at one end.
Figure 16:
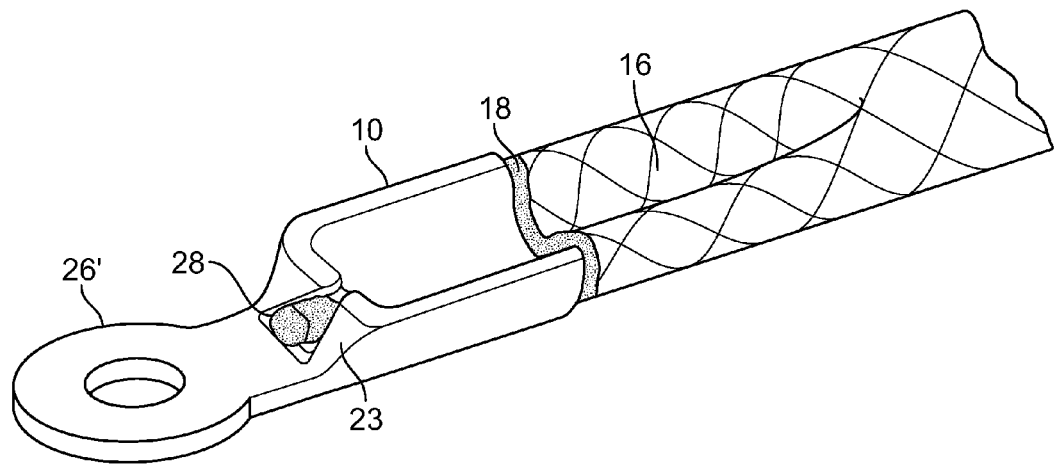
FIG. 16 shows the sealed tube termination of FIG. 15 with an opening for venting volatile materials during fusing, according to an embodiment of the present invention.

FIG. 14 shows another preferred embodiment in which the terminal includes a terminal connector 26 extending from the tubular termination. FIG. 15 shows an alternative embodiment in which the terminal connector 26' is substantially closed/sealed at one end 23. In such circumstances, when the insulating material 18 melts and flows towards each of the ends 23 of the terminal tube 10, the insulating material 18 may be partially vaporized, thereby building up vapor pressure in the sealed terminal connector 26'. The sealed terminal connector 26' may possibly behave like a projective and violently disengage from the fused wire(s) 16. Referring now to FIG. 16, an opening 28 may be formed in the sealed terminal connector 26' to relieve pressure buildup of volatized materials.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An insulated wire joint, comprising:
    a tube having an open end; and
    a portion of a plurality of wires placed in the tube, wherein each wire of the plurality of wires distal to the open end of the tube is individually insulated with a first insulation material, and wherein an outer surface of each wire of the plurality of wires proximal to the open end of the tube is free of first insulation material; and
    a second insulating material formed proximal to the open end of the tube and formed about the outer surface of each wire of the plurality of wires free of the first insulation material.

2. The wire joint of claim 1, wherein, during the application of pressure and heat, the temperature of the second insulating material is raised above its melting point, thereby driving the second insulating material toward the open end.

3. The wire joint of claim 2, wherein upon removal of heat, the second insulating material solidifies.

4. The wire joint of claim 3, wherein the second insulating material maintains the same composition upon heating and re-solidifying.

5. The wire joint of claim 1, wherein the second insulating material is a thermoplastic.

6. The wire joint of claim 1, wherein the second insulating material is wax.

7. The wire joint of claim 1, wherein the second insulating material is initially a solid tube.

8. The wire joint of claim 1, wherein the second insulating material is sprayed on the wires.

9. The wire joint of claim 1, wherein the second insulating material is sprayed on an inner surface of the tube.

10. The wire joint of claim 1, wherein the second insulating material initially has a shape of a washer and is initially oriented along a plane perpendicular to the wires and the tube proximal to the open end of the tube.

* * * * *